United States Patent
Mori et al.

(10) Patent No.: US 6,893,132 B2
(45) Date of Patent: May 17, 2005

(54) CAMERA-ASSISTED PRESENTATION SYSTEM

(75) Inventors: Isao Mori, Aichi (JP); Masaki Tanabe, Aichi (JP); Ryuichi Mizumoto, Mie (JP)

(73) Assignee: Elmo Company, Limited (JP)

( * ) Notice: Subject to any disclaimer, the term of this patent is extended or adjusted under 35 U.S.C. 154(b) by 185 days.

(21) Appl. No.: 10/437,618

(22) Filed: May 13, 2003

(65) Prior Publication Data

US 2005/0046811 A1 Mar. 3, 2005

(30) Foreign Application Priority Data

May 29, 2002 (JP) ........................................ 2002-156147

(51) Int. Cl.[7] ........................ G03B 21/08; G03B 21/06; G03B 21/00; G02F 1/1335
(52) U.S. Cl. ........................ 353/63; 353/65; 353/122; 353/DIG. 3; 349/6
(58) Field of Search .......................... 353/26, 63, 64, 353/65, 122, DIG. 3; 349/6

(56) References Cited

U.S. PATENT DOCUMENTS

D454,570 S * 3/2002 Adachi et al. ............. D14/423
6,474,819 B2 * 11/2002 Yoder et al. .................. 353/98
6,550,922 B2 * 4/2003 Bogomolnyi ............... 353/122

* cited by examiner

*Primary Examiner*—Judy Nguyen
*Assistant Examiner*—Melissa J Koval
(74) *Attorney, Agent, or Firm*—Ostrolenk, Faber, Gerb & Soffen, LLP

(57) ABSTRACT

In a camera-assisted presentation system, a microcomputer activates a motion detecting module to detect a motion of an object, based on a variation in luminance of image data representing a material photographed by a photographing module. In the case of detection of a motion of the object, the microcomputer controls an output control module to prohibit transfer of the image data to an image output module. Image data photographed immediately before detection of the motion is kept in an output image storage sub-module of the image output module. This arrangement effectively prevents any action of setting the material from being undesirably displayed on an external display unit, thus ensuring smooth presentation with improved display of images during the actions of setting the material in the camera-assisted presentation system.

10 Claims, 8 Drawing Sheets

CAMERA-ASSISTED PRESENTATION SYSTEM

BACKGROUND OF THE INVENTION

1. Field of the Invention

The present invention relates to a camera-assisted presentation system that causes photographed images of materials to be displayed on a display unit.

2. Description of the Related Art

Camera-assisted presentation systems have been known and widely used for the purpose of education and presentation. The systems photograph materials and samples to make photographed images displayed on a display unit, such as a monitor or a projector. With the recent advancement of the camera technology, some of the camera-assisted presentation systems have the high resolution and are capable of outputting images of more than 1 million pixels.

The conventional camera-assisted presentation systems, however, also display the user's actions of setting the material on a display unit. In the case of displaying such actions, with the enhanced resolution of a camera built in the camera-assisted presentation system, some frames may be omitted due to a time lag between photographing of the material and actual display of a photographed image. Such omission of frames in the series of images may worsen the impression of the presentation.

SUMMARY OF THE INVENTION

The object of the present invention is thus to improve display of images during an action of setting a material.

In order to attain at least part of the above and the other related objects, the present invention is directed to a camera-assisted presentation system that causes an image to be displayed on a display unit connecting therewith. The camera-assisted presentation system includes: an image data generation module that photographs an object and generates image data representing the photographed object; an image output module that outputs the generated image data in the form of an image signal to the display unit; a motion detecting module that detects a motion of the object; and an output control module that changes an output mode of the image data according to detection of a motion or no motion of the object.

The image data generation module may include a CCD camera. The image data representing the object that is photographed by the image data generation module are output in the form of an image signal by the image output module to any of diverse display units, such as CRTs, projectors, TV sets, and LCDs.

In the process of outputting the image signal from the image output module, the output mode is changed in response to detection of a motion or no motion of the object by the motion detecting module. The change of the output mode may be attained by continuously varying a selected factor with regard to the image data or by discretely varying the selected factor, that is, by switching over the output mode. The camera-assisted presentation system of this arrangement automatically determines whether or not the object is under setting and prevents potential troubles due to unprocessed display of images photographed during the setting action.

In one preferable application of the camera-assisted presentation system, the change of the output mode is attained by changing over the output of the image signal from ON to OFF, in response to detection of the motion of the object by the motion detecting module. This arrangement enables the displayed image to be changed to a black solid image or a white solid image during an action of setting the object.

In another preferable application of the camera-assisted presentation system, the resolution of the image data generated by the image data generation module is lowered, in response to detection of the motion of the object by the motion detecting module. This arrangement lowers the data quantity of the photographed image data and heightens the frame rate photographable per unit time, thereby reducing the time lag in the process of displaying images on the display unit.

One typical technique of lowering the resolution is to skip scanning lines when the image data generation module photographs the object. The CCD camera may have two photographing modes, an all pixels reading mode and a fast draft reading mode. The all pixels reading mode scans all the effective pixels of the CCD and is thus suitable for taking a still image. The fast draft reading mode, on the other hand, skips the scanned pixels and thereby heightens the frame rate. When the CCD camera is applied to the image data generation module, the resolution is varied by a changeover between these two modes.

In still another preferable application of the camera-assisted presentation system, a preset still image is output, in response to detection of the motion of the object by the motion detecting module. This arrangement prevents an image showing the setting action from being undesirably displayed on the display unit. The preset still image may be a monochromatic image, such as a black solid image or a white solid image, or an image representing a desired message like 'Under Setting' or 'Please Wait'. It is, however, more preferable that the preset still image represents the image data generated by the image data generation module immediately before detection of the motion of the object. Display of such image data ensures smooth presentation without making the audience specifically conscious of the user's action of setting the material.

In one preferable embodiment of the application that outputs the image data generated immediately before detection of the motion of the object, the image output module has an image data storage sub-module that sequentially stores the generated image data as output data, and the output control module prohibits the storage of the image data storage sub-module from being updated, in the case of detection of the motion of the object.

The image data representing the photographed object are sequentially recorded in the image data storage sub-module. The image output module successively reads the image data from this image data storage sub-module and outputs the image data in the form of image signals. In the structure of this embodiment, in response to detection of the motion of the object, the output control module prohibits the storage of the image data storage sub-module from being updated. The image data generated immediately before detection of the motion is accordingly kept in the image data storage sub-module. The image output module reads and outputs this image data kept in the image data storage sub-module. This arrangement thus desirably prevents any image showing the action of setting the object from being displayed on the display unit.

It is convenient that the user can visually check the image data of the photographed object to adjust the setting position of the object, while the preset still image is displayed on the display unit. In another preferable embodiment of the present invention, the camera-assisted presentation system further includes a monitor output module that causes the image data generated by the image data generation module to be displayed, regardless of the output mode of the image data.

The present invention is also directed to another camera-assisted presentation system that causes an image to be displayed on a display unit connecting therewith. The camera-assisted presentation system includes: an image data generation module that photographs an object and generates image data representing the photographed object; an image data storage module that stores the image data generated at a predetermined timing by the image data generation module as still image data; an image output module that outputs the still image data in the form of an image signal to the display unit; a motion detecting module that detects a motion of the object; and an update control module that updates the storage of the image data storage module, in response to detection of a stop of a motion of the object detected by the motion detecting module.

In the case of detection of the motion of the object, the output still image data is updated at a timing of a stop of the motion. This arrangement thus desirably prevents any image showing the setting action from being displayed on the display unit. It is preferable that this camera-assisted presentation system further includes the monitor output module discussed above.

In any of the camera-assisted presentation systems discussed above, the motion detecting module detects a motion or no motion of the object through comparison of image data generated in time series by the image data generation module. The motion of the object may be detected according to a variation in mean luminance of all the pixels or according to a variation in luminance of each of divisional blocks set by division of the image data. The motion detecting module may have an infrared sensor, a position sensor, or any of other diverse sensors.

The technique of the present invention is not restricted to the camera-assisted presentation systems discussed above, but is also applicable to corresponding image output methods executed in these camera-assisted presentation systems, programs that cause a computer to attain the image output methods, and computer-readable recording media in which such computer programs are recorded.

The above and other objects, features, aspects, and advantages of the present invention will become more apparent from the following detailed description of the preferred embodiments with the accompanying drawings.

DESCRIPTION OF THE PREFERRED EMBODIMENTS

Figure 1:
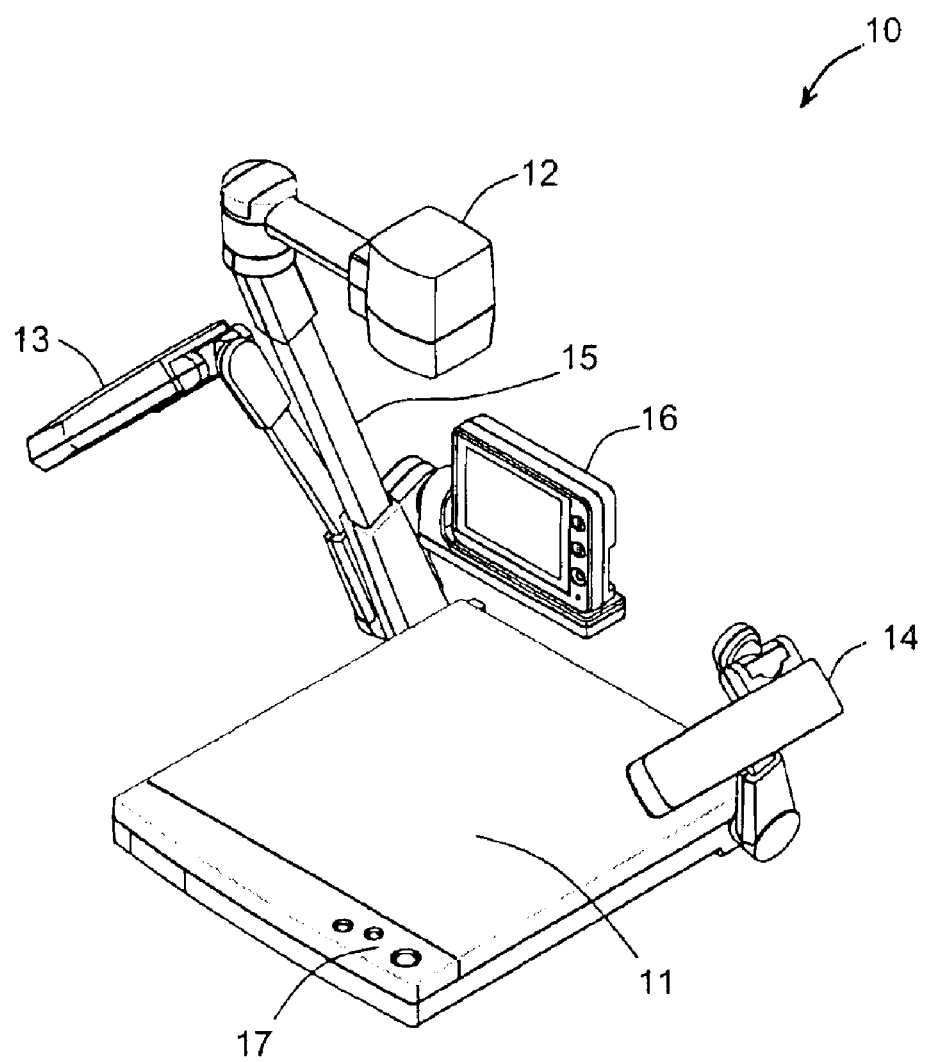
FIG. 1 is a perspective view schematically illustrating a camera-assisted presentation system in a first embodiment of the present invention.

Some modes of carrying out the invention are discussed below as preferred embodiments in the following sequence:
A. First Embodiment
  (A1) Outline of Camera-Assisted Presentation System
  (A2) Internal Structure of Camera-Assisted Presentation System
  (A3) Image Output Control Routine
B. Second Embodiment
  (B1) Internal Structure of Camera-Assisted Presentation System
  (B2) Image Output Control Routine
C. Third Embodiment
  (C1) Internal Structure of Camera-Assisted Presentation System
  (C2) Image Output Control Routine
D. Modified Example
A. First Embodiment
  (A1) Outline of Camera-Assisted Presentation System FIG. 1 is a perspective view schematically illustrating a camera-assisted presentation system 10 in a first embodiment of the present invention. The camera-assisted presentation system 10 includes a table 11 occupying most of its bottom area, a camera head 12 facing the table 11, and a pair of lamps 13 and 14 located on the left and the right sides of the table 11 to illuminate the upper surface of the table 11. Each of the lamps 13 and 14 is pivotally rotatable about the corresponding left or right rear end of the table 11 and is used to photograph an object or a material mounted on the table 11.

The camera head 12 is supported by an arm 15 to face a practically center area of the table 11 and is actuated to photograph a diversity of materials mounted on the table 11. The camera head 12 includes an auto-focusing CCD camera and has various functions relating to photographing, for example, functions of zoom and white balance adjustment. The camera head 12 outputs photographed images to an external display unit (not shown), such as a television set, a projector, or an LCD, as well as to a check monitor 16.

A manipulation unit 17 is located on the front side of the camera-assisted presentation system 10. The manipulation unit 17 has multiple operation switches to attain various settings including the ON/OFF state of the lamps 13 and 14, the aperture of the CCD camera, the zoom, the white balance adjustment, the focusing adjustment, the changeover of output destination of images, and the resolution of output images.

(A2) Internal Structure of Camera-Assisted Presentation System

Figure 2:
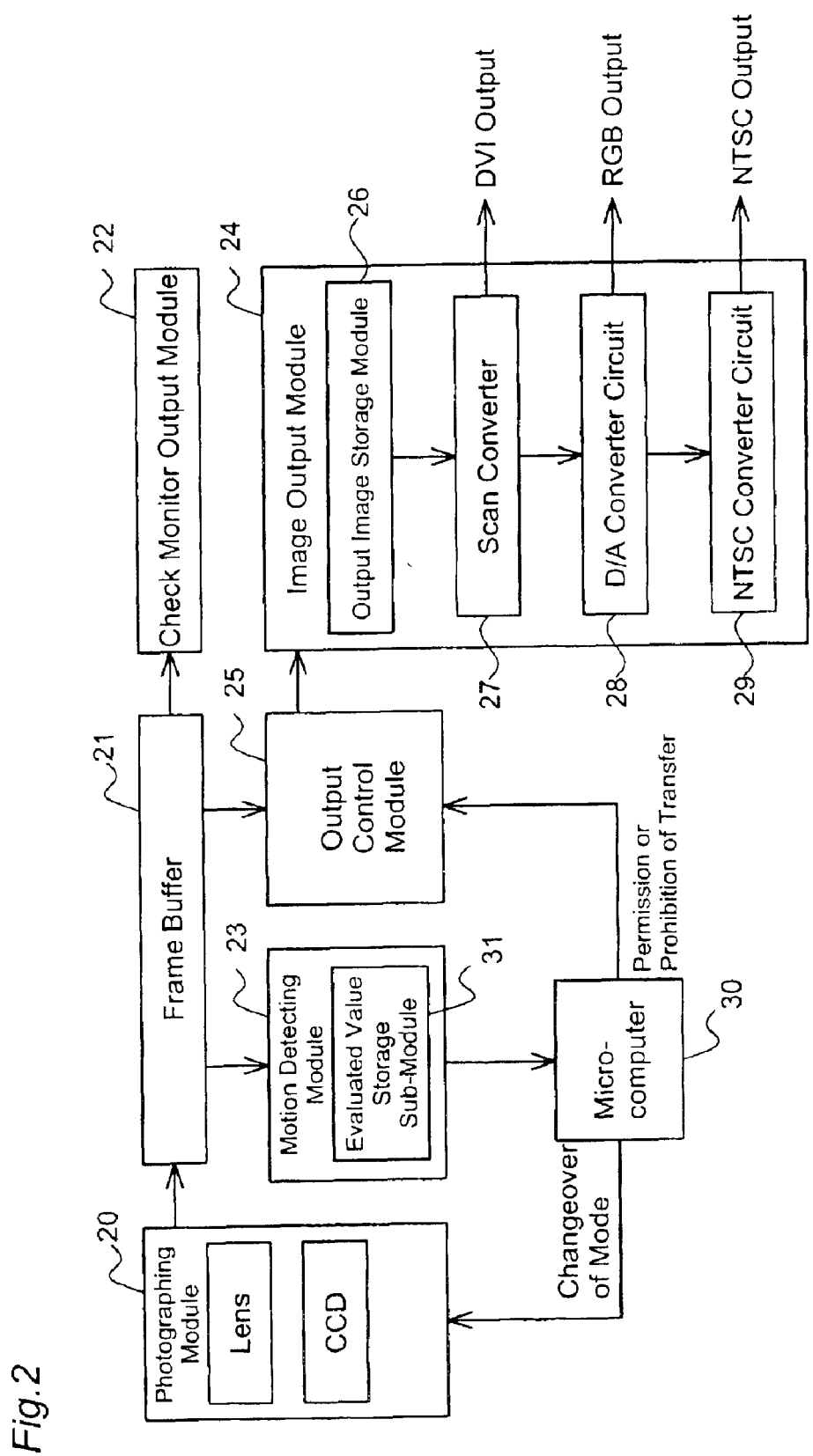
FIG. 2 is a block diagram schematically illustrating the internal structure of the camera-assisted presentation system of the first embodiment.

FIG. 2 is a block diagram schematically illustrating the internal structure of the camera-assisted presentation system 10. As shown in FIG. 2, the camera-assisted presentation system 10 includes some modules as follows: a photographing module 20 that has a lens and a charge-coupled device (CCD); a frame buffer 21 that temporarily holds image data generated by the photographing module 20; a check monitor output module 22 that outputs images to the check monitor 16; a motion detecting module 23 that detects a motion of the material or the object; an image output module 24 that outputs images to an external display unit; and an output control module 25 that controls transfer of image data from the frame buffer 21 to the image output module 24.

The image output module 24 has an output image storage sub-module 26 that stores the image data transferred from the frame buffer 21 by means of the output control module 25 as output image data, a scan converter 27 that converts the resolution of the image data into a resolution specified by the user, a D/A converter circuit 28 that converts the image signals processed by the scan converter 27 into analog signals, and an NTSC converter circuit 29 that converts the D/A converted image signals into NTSC signal.

The camera-assisted presentation system 10 further includes a microcomputer 30 to control the respective constituents discussed above. The microcomputer 30 has a CPU, a ROM with control programs stored therein, and a RAM used as a work area for execution of programs.

The photographing module 20 has two photographing modes, 'all pixels reading mode' and 'fast draft reading mode'. In the 'all pixels reading mode', all the pixels constituting the CCD are scanned and imaged. The CCD of this embodiment includes 2 million pixels and accordingly has a high resolution of 1600?1200 (pixels). The 'all pixels reading mode' can thus photograph only images of 7.5 frames per second. The 'fast draft reading mode', on the other hand, skips some of scanned pixels to have a lowered resolution of 640?240 (pixels) and photographs images of this lowered resolution. This mode enables images of 30 frames per second to be photographed.

The image data generated by the photographing module 20 are sequentially written into the frame buffer 21. The frame buffer 21 holds one frame of image data, regardless of the resolution. The check monitor output module 22 sequentially reads image data from the frame buffer 21 and outputs images to the check monitor 16. The user checks the photographing state of the material on the check monitor 16 and adjusts the position of the material mounted on the table 11 according to the requirements. The image data written in the frame buffer 21 are transferred to the image output module 24 by means of the output control module 25. The output control module 25 adjusts the timing of transfer of the image data. The transfer of image data is prohibited or allowed in response to detection of a motion or no motion of the object or the material by the motion detecting module 23.

The motion detecting module 23 detects a motion of the material mounted on the table 11, based on a variation in luminance of the image data written in time series in the frame buffer 21. One typical procedure of such detection is described briefly. The motion detecting module 23 first divides the image data written in the frame buffer 21 into multiple unit blocks of 8?8 (pixels) in size. When the image data written in the frame buffer 21 is image data of 640?240 (pixels) generated in the fast draft reading mode, the image data is divided into 80?30 blocks. The motion detecting module 23 calculates the mean luminance in each of these divisional blocks and temporarily records the calculated mean luminance in an internal evaluated value storage sub-module 31. When a next frame of image data is written into the frame buffer 21, the motion detecting module 23 calculates the mean luminance in each of divisional blocks with regard to this next frame of image data in a similar manner. The motion detecting module 23 then compares the calculated mean luminance in each divisional block with regard to the currently processed frame of image data with the mean luminance in each divisional block with regard to the previous frame of image data recorded in the evaluated value storage sub-module 31. In the case where a variation in mean luminance is found at a preset rate, for example, at a rate of 30% or greater of all the blocks, it is determined that there is a motion of the material. When the variation in mean luminance is found at a rate of less than 30% of the all blocks, it is determined that there is no motion of the material. Some error may be allowed in determination of the variation or no variation in mean luminance in each block.

The image output module 24 temporarily holds the image data transferred by the output control module 24 until a next frame of image data is transmitted to the output image storage sub-module 26. The scan converter 27 converts the resolution of the image data into the resolution specified by the user and generates image signals at a frequency suitable for output of the image data to the external display unit. The image signals generated here may be subjected to DVI output in the form of digital signals. The digital signals may further be converted into analog signals by the D/A converter circuit 27 and output as analog RGB signals. The analog RGB signals may be converted into NTSC signals and output by the NTSC converter circuit 28. The user links any of connection terminals for outputting these signals with a desired external display unit to display images. The DVI output may be used to display images on, for example, a liquid crystal display (LCD). The analog RGB signals may be used to display images on, for example, a CRT. The NTSC signals may be used to display images on, for example, a TV monitor.

(A3) Image Output Control Routine

Figure 3:
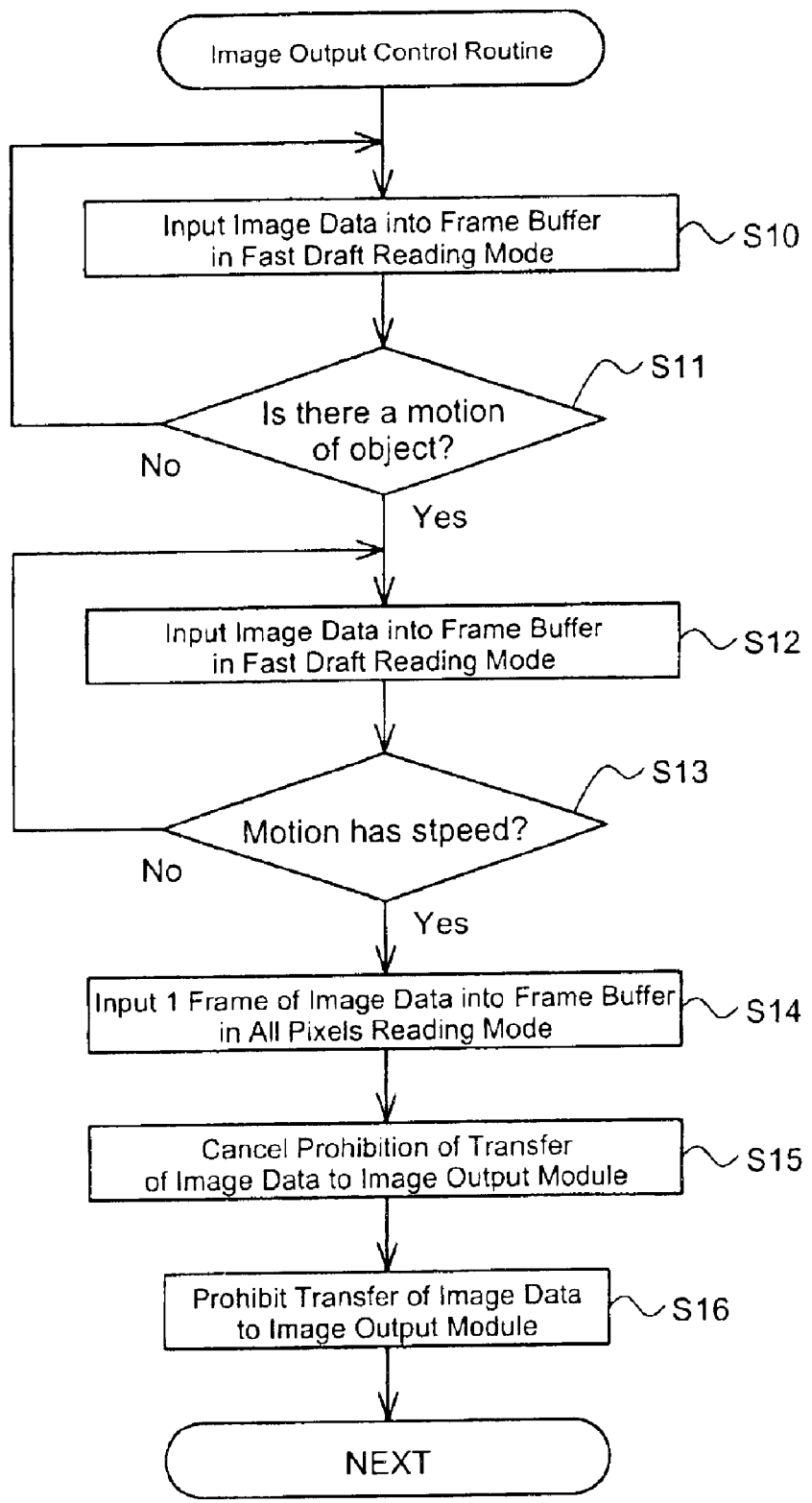
FIG. 3 is a flowchart showing an image output control routine executed by a microcomputer in the first embodiment.

FIG. 3 is a flowchart showing an image output control routine executed by the microcomputer 30 in the first embodiment. This routine is executed on the premises that the output image storage sub-module 26 has no record in the initial state and that transfer of image data by means of the output control module 25 is prohibited in the initial state. The microcomputer 30 first sets the photographing module 20 in the fast draft reading mode to photograph an object and input image data representing the photographed object in the fast draft reading mode into the frame buffer 21 (step S10). The motion detecting module 23 is then activated to detect a motion of the object (step S11). In the case of detection of no motion of the object at step S11, the processing of steps S10 and S11 is repeated until detection of a motion of the object. In the case of detection of a motion of the object at step S11, on the other hand, the microcomputer 30 again activates the photographing module 20 to input the image data generated in the fast draft reading mode into the frame buffer 21 (step S12) and activates the motion detecting module 23 to detect a stop of the motion (step S13). In the case where the motion still continues, the program returns to step S12 and loops the processing of step S11 and S12 until detection of a stop of the motion. In response to detection of a stop of the motion, the microcomputer 30 changes over the mode setting of the photographing module 20 to the all pixels reading mode to input 1 frame of image data into the frame buffer 21 (step S14). The microcomputer 30 subsequently activates the output control module 25 to cancel the prohibition of transfer of image data to the image output module 24 (step S15). The image data are then transferred to the image output module 24. On completion of the transfer of image data, the microcomputer 30 activates the output control module 25 to prohibit again transfer of the image data to the image output module 24 (step S16). The microcomputer 30 repeatedly executes this series of processing, while the camera-assisted presentation system 10 is ON.

The structure of this embodiment enables the image data registered in the output image storage sub-module 26 of the image output module 24 to be updated at a stop timing of the motion of the object. This arrangement accordingly prevents any action of setting the material, for example, at the time of replacement of the material from being undesirably displayed on the external display unit and thereby ensures smooth presentation. The photographed images are constantly output to the check monitor 16, regardless of the motion of the object. The user can thus check the photographing state of the material on the check monitor 16.

In one preferable application of this embodiment, a preset message, such as 'Under Setting' or 'Please Wait', may be given during a motion of the object. In this application, at step S11 in the image output control routine discussed above, the microcomputer 30 directly transfers image data representing such a preset message from the RAM of the microcomputer 30 to the image output module 24, in response to detection of a motion of the object. This arrangement explicitly informs the audience of the setting status, for example, at the time of replacement of the material.

Figure 4:
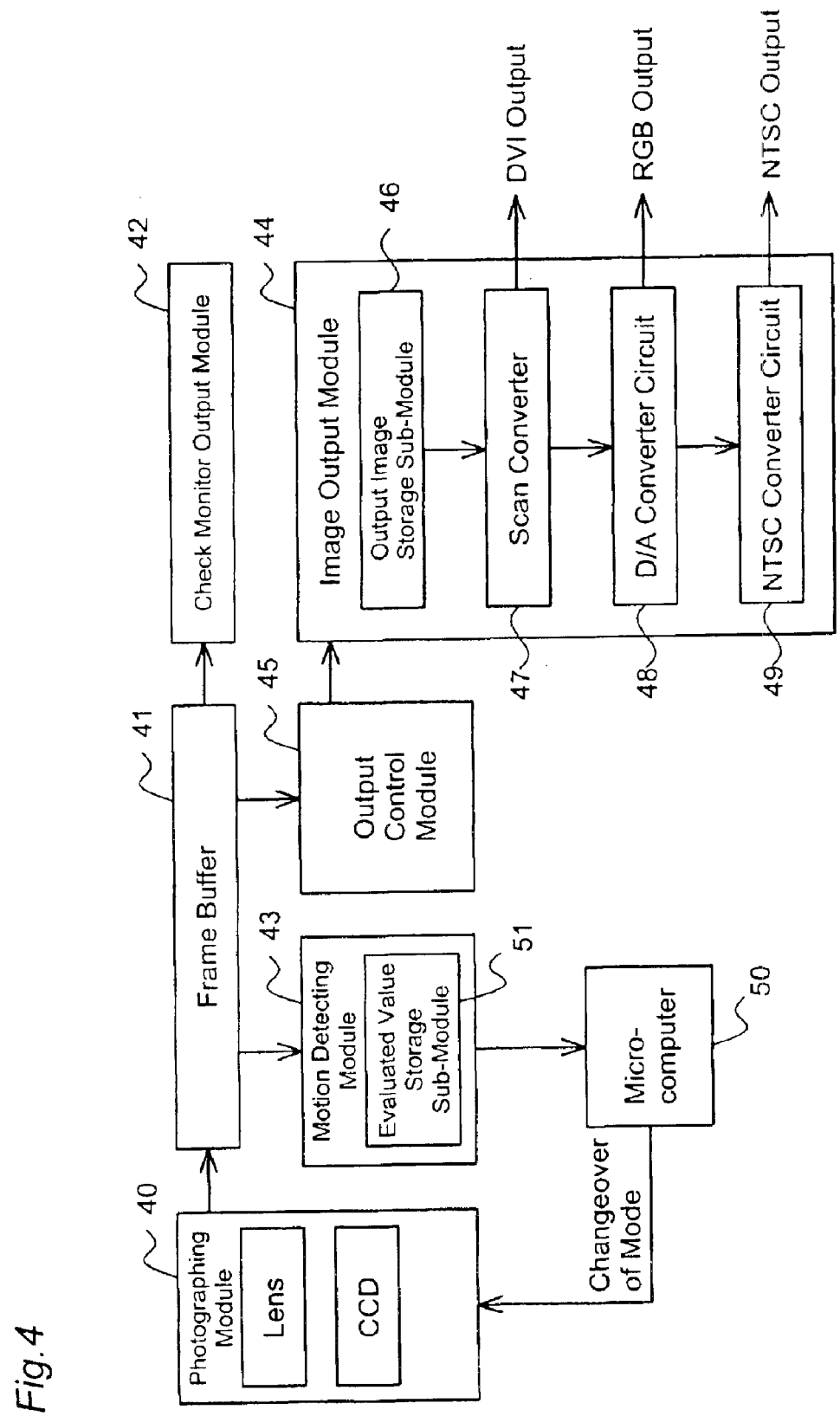
FIG. 4 is a block diagram schematically showing the internal structure of another camera-assisted presentation system in a second embodiment of the present invention.

B. Second Embodiment
(B1) Internal Structure of Camera-Assisted Presentation System FIG. 4 is a block diagram schematically showing the internal structure of another camera-assisted presentation system 10A in a second embodiment of the present invention. The camera-assisted presentation system 10A of the second embodiment has a photographing module 40, a frame buffer 41, a check monitor output module 42, a motion detecting module 43 including an evaluated value storage sub-module 51, an image output module 44, an output control module 45, and a microcomputer 50. The image output module 44 includes an output image storage sub-module 46, a scan converter 47, a D/A converter circuit 48, and an NTSC converter circuit 49. The functions of the respective constituents in the second embodiment are substantially similar to those of the constituents of the camera-assisted presentation system 10 in the first embodiment. The difference is that the output control module 45 of the second embodiment is not under control of the microcomputer 50 with regard to permission or prohibition of transfer of image data. The image data written into the frame buffer 41 are thus sequentially transferred to the image output module 44 regardless of the motion of the object, and are output to an external display unit. The photographing module 40 of the second embodiment is capable of photographing 15 frames of image data per second with a resolution of 1024?768 (pixels) in the all pixels reading mode. The frame rate of this level ensures little effects of the time lag when a motion of the object is detected based on the image photographed in the all pixels reading mode.

(B2) Image Output Control Routine

Figure 5:
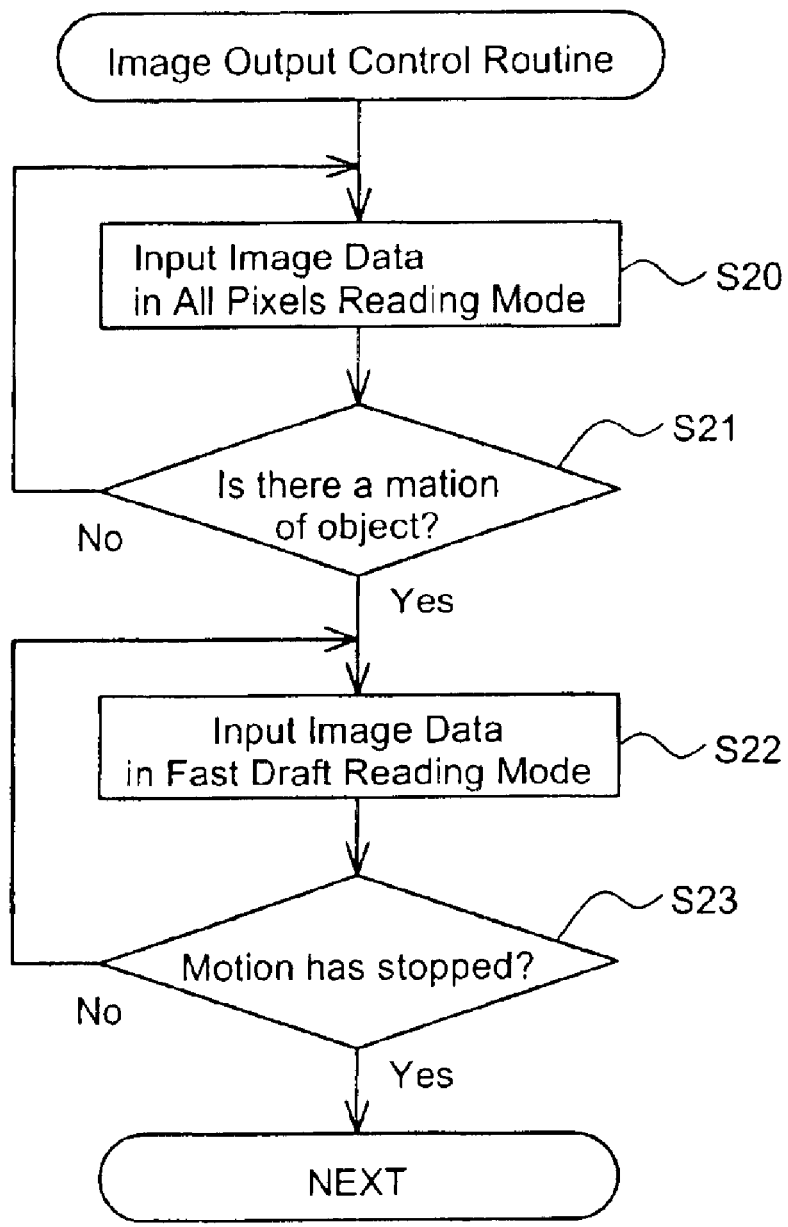
FIG. 5 is a flowchart showing an image output control routine executed by the microcomputer in the second embodiment.

FIG. 5 is a flowchart showing an image output control routine executed by the microcomputer 50 in the second embodiment. The microcomputer 50 first sets the photographing module 40 in the all pixels reading mode to photograph an object and input image data representing the photographed object into the frame buffer 41 (step S20). The motion detecting module 43 is then activated to detect a motion of the object (step S21). In the case of detection of no motion of the object at step S21, the program returns to the processing of step S20. When the object has no motion, the image data representing the object photographed in the all pixels reading mode are thus sequentially output to the external display unit. In the case of detection of a motion of the object at step S21, on the other hand, the microcomputer 50 changes over the setting mode of the photographing module 40 to the fast draft reading mode to input image data generated in the fast draft reading mode into the frame buffer 41 (step S22). The motion detecting module 43 is then activated again to detect a stop of the motion (step S23). In the case where the motion still continues, the program returns to step S21. The image data representing the photographed object in the fast draft reading mode is accordingly output to the external display unit during the motion of the object. The microcomputer 50 repeatedly executes this series of processing, while the camera-assisted presentation system 10A is ON.

The technique of the second embodiment outputs images of a low resolution and a high frame rate in the case of a motion of the object, while outputting images of a high resolution and a low frame rate in the case of no motion of the object. The camera-assisted presentation system 10A of this embodiment gives constant output of images to the external display unit without any omission of frames even during the actions of setting the materials, and automatically outputs images of the high resolution after completion of the setting. This arrangement enables the user to give a smooth presentation without any omission of frames.

Figure 6:
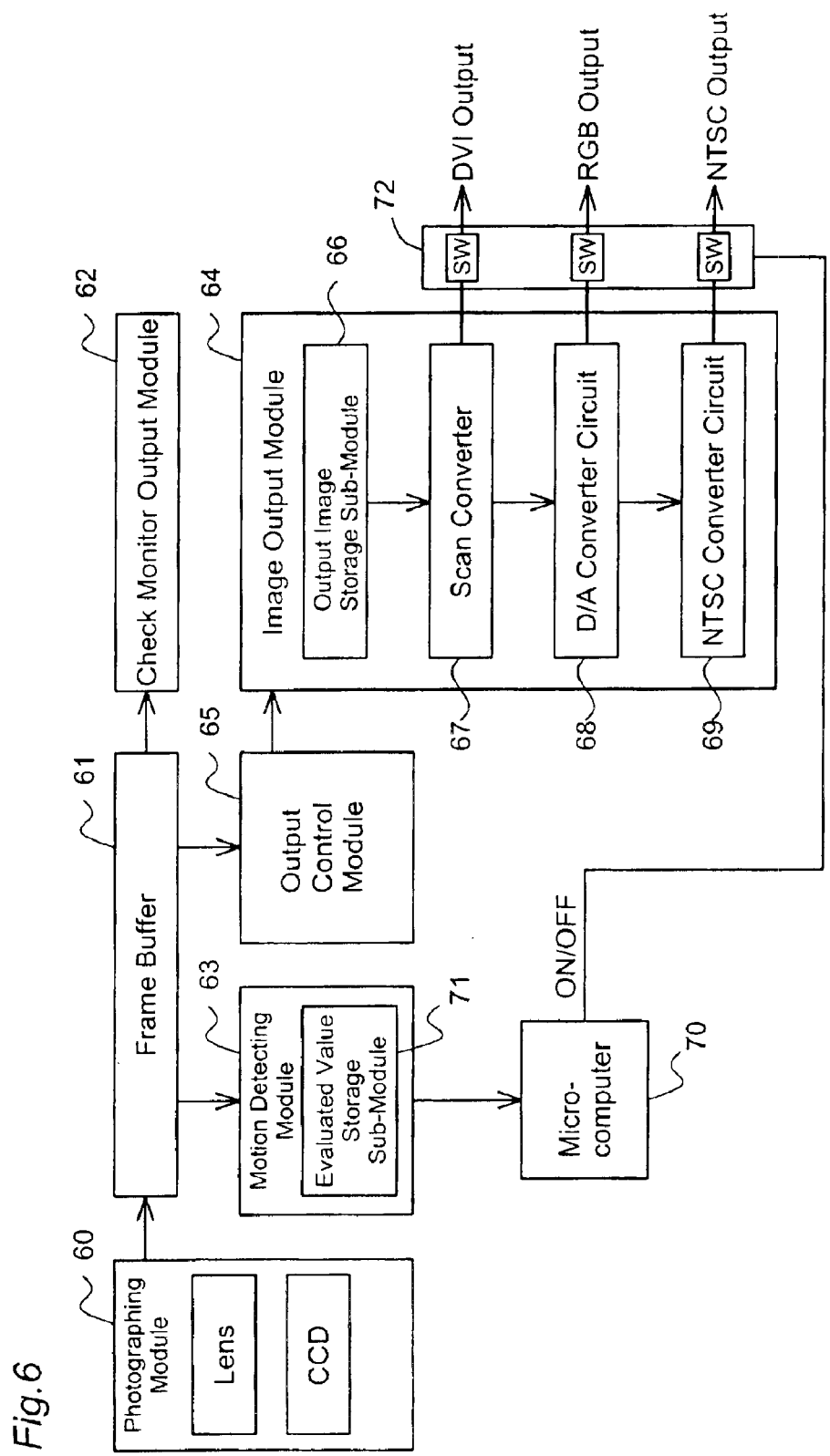
FIG. 6 is a block diagram schematically showing the internal structure of still another camera-assisted presentation system in a third embodiment of the present invention.

C. Third Embodiment
(C1) Internal Structure of Camera-Assisted Presentation System FIG. 6 is a block diagram schematically showing the internal structure of still another camera-assisted presentation system 10B in a third embodiment of the present invention. Like the camera-assisted presentation systems 10 and 10A of the first and the second embodiments discussed above, the camera-assisted presentation system 10B of the third embodiment has a photographing module 60, a frame buffer 61, a check monitor output module 62, a motion detecting module 63 including an evaluated value storage sub-module 71, an image output module 64, an output control module 65, and a microcomputer 70. The image output module 64 includes an output image storage sub-module 66, a scan converter 67, a D/A converter circuit 68, and an NTSC converter circuit 69. The functions of the respective constituents in the third embodiment are substantially similar to those of the constituents in the first embodiment and the second embodiment. The differences are that the photographing module 60 of this embodiment does not specify the setting of the reading mode and that the output control module 65 is not under control of the microcomputer 70 with regard to permission or prohibition of transfer of image data. The structure of this embodiment has a switch 72 in the downstream of the image output module 64. This switch 72 sets ON and OFF transmission of image signals output from the image output module 64 and is under control of the microcomputer 70. When the motion detecting module 63 activated by the microcomputer 70 detects a motion of an object, the microcomputer 70 sets this switch 72 OFF. It is preferable that the switch 72 sets OFF transmission of only color signals representing the colors of image data, such as RGB, among all the signal components of each image signal, while allowing transmission of the synchronizing signals. The prohibited transmission of the synchronizing signals sets an external display unit in a standby mode and may take a relatively long time for restoration of the external display unit to its working mode.

(C2) Image Output Control Routine

Figure 7:
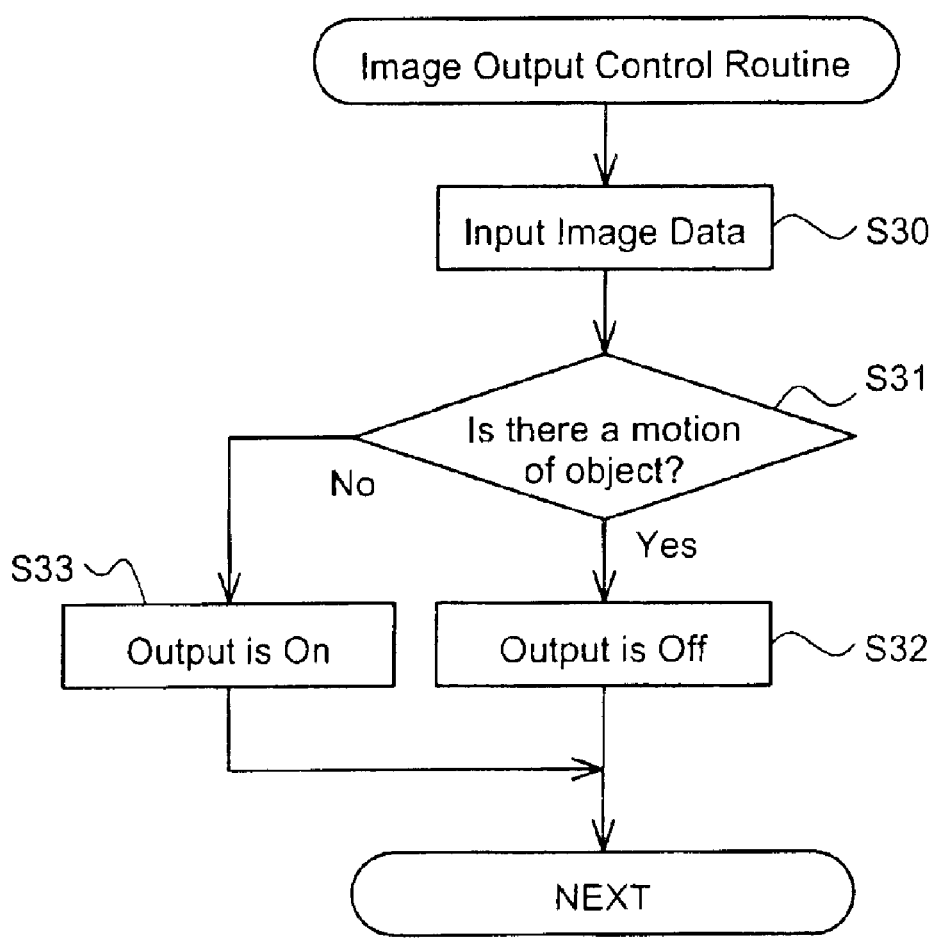
FIG. 7 is a flowchart showing an image output control routine executed by the microcomputer in the third embodiment.

FIG. 7 is a flowchart showing an image output control routine executed by the microcomputer 70 in the third embodiment. The microcomputer 70 first activates the photographing module 60 to photograph an object and input image data representing the photographed object into the frame buffer 61 (step S30). The image data are then transferred to the image output module 64 by means of the output control module 65, and the image output module 64 generates an image signal based on the transferred image data. The motion detecting module 63 is activated by the microcomputer 70 to detect a motion of the object (step S31). In the case of detection of a motion of the object at step S31, the microcomputer 70 sets the switch 72 OFF to prohibit transmission of the image signal output from the image output module 64 (step S32). In the case of detection of no motion of the object at step S31, on the other hand, the microcomputer 70 sets the switch 720N to allow transmission of the image signal output from the image output module 64 (step S33). The microcomputer 70 repeatedly executes this series of processing, while the camera-assisted presentation system 10B is ON.

The third embodiment adopts the simple structure to prevent any image showing the setting action of the material from being undesirably displayed.

D. Modified Example

Figure 8:
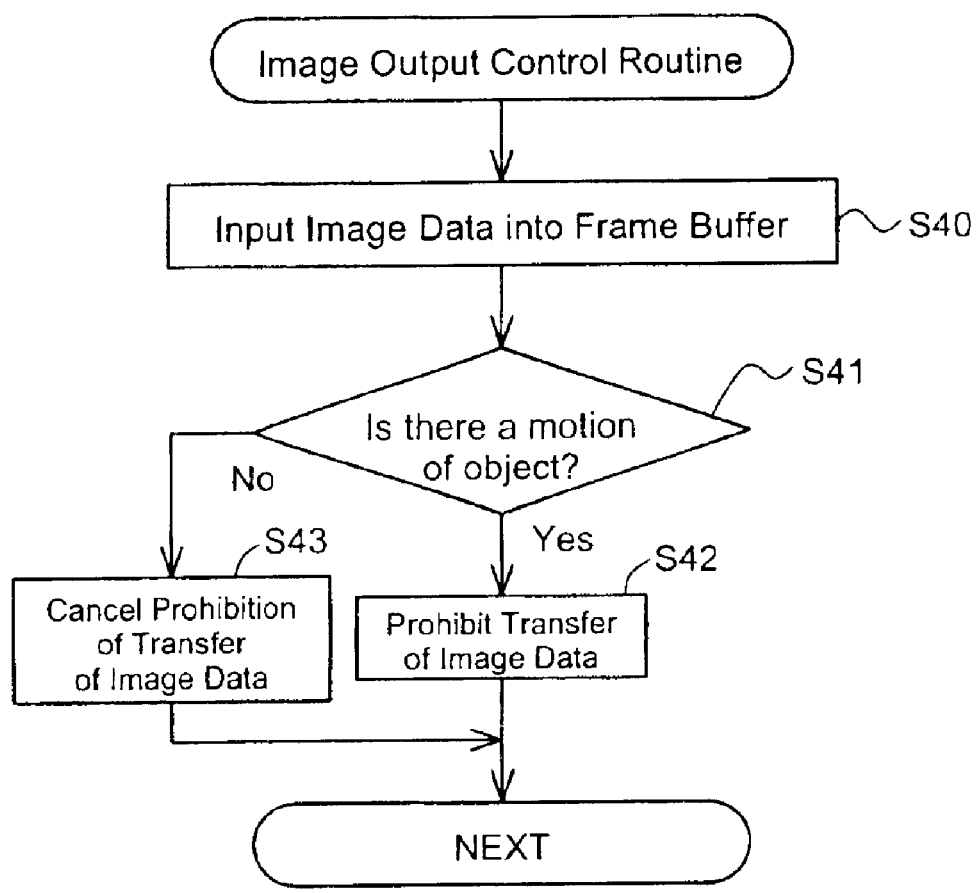
FIG. 8 is a flowchart showing an image output control routine in a modified example of the first embodiment.

Another image output control routine is discussed below as a modified example of the first embodiment. FIG. 8 is a flowchart showing the image output control routine in the modified example of the first embodiment. The microcomputer 30 sets the photographing module 20 in the all pixels reading mode and inputs image data representing an object photographed in the all pixels reading mode into the frame buffer 21 (step S40). The motion detecting module 23 is then activated by the microcomputer 30 to detect a motion of the object (step S41). In the case of detection of a motion of the object at step S41, the microcomputer 30 controls the output control module 25 to prohibit transfer of the image data (step S42). In the case of detection of no motion of the object at step S41, on the other hand, the microcomputer 30 cancels the prohibition of transfer of the image data (step S43). The microcomputer 30 repeatedly executes this series of processing, while the camera-assisted presentation system 10 is ON.

The simple image output control routine of this modified example enables a still image photographed immediately before detection of the motion of the object to be displayed during the action of setting the material. This method detects a motion of the object with the high-resolution image data and accordingly takes a relatively long time for detection. The preferable environment for execution of this processing is accordingly the resolution equivalent to SVGA (800?600) or XGA (1024?768) in the all pixels reading mode. In the processing of this modified example, the still image displayed on the external display unit during a motion of the object may be replaced by a message like 'Please Wait' or 'Under Setting'. Such modified display is attained by directly transferring image data corresponding to a desired message from the RAM of the microcomputer 30 to the output image storage sub-module 26 while prohibiting transfer of the image data at step S42 in the flowchart of FIG. 8.

The embodiments discussed above are to be considered in all aspects as illustrative and not restrictive. There may be many modifications, changes, and alterations without departing from the scope or spirit of the main characteristics of the present invention. In the above embodiments, a motion of the object or material is detected, based on the image recorded in the frame memory. The motion of the material may alternatively be detected by a position sensor used in optical mice or another suitable sensor, which is located in the vicinity of the center of the table 11. Part or all of the functions actualized by the hardware structure in any of the above embodiments may be attained by the software configuration.

The scope and spirit of the present invention are indicated by the appended claims, rather than by the foregoing description.

What is claimed is:

1. A camera-assisted presentation system that causes an image to be displayed on a display unit connecting therewith, said camera-assisted presentation system comprising:

an image data generation module that photographs an object and generates image data representing the photographed object;

an image output module that outputs the generated image data in the form of an image signal to said display unit;

a motion detecting module that detects a motion of the object; and an output control module that changes an output mode of the image data according to detection of a motion or no motion of the object.

2. A camera-assisted presentation system in accordance with claim 1, wherein said output control module controls said image output module to change over the output of the image signal from ON to OFF, in response to detection of the motion of the object.

3. A camera-assisted presentation system in accordance with claim 1, wherein said output control module controls said image data generation module to lower a resolution of the generated image data, in response to detection of the motion of the object.

4. A camera-assisted presentation system in accordance with claim 1, wherein said output control module controls said image output module to output a preset still image, in response to detection of the motion of the object.

5. A camera-assisted presentation system in accordance with claim 4, wherein the preset still image represents the image data generated immediately before detection of the motion of the object.

6. A camera-assisted presentation system in accordance with claim 4, wherein said image output module has an image data storage sub-module that sequentially stores the generated image data as output data, and said output control module prohibits the storage of said image data storage sub-module from being updated, in the case of detection of the motion of the object.

7. A camera-assisted presentation system in accordance with claim 4, said camera-assisted presentation system further comprising:

a monitor output module that causes the image data generated by said image data generation module to be displayed, regardless of the output mode of the image data.

8. A camera-assisted presentation system in accordance with claim 1, wherein said motion detecting module detects a motion or no motion of the object through comparison of image data generated in time series by said image data generation module.

9. A camera-assisted presentation system that causes an image to be displayed on a display unit connecting therewith, said camera-assisted presentation system comprising:

an image data generation module that photographs an object and generates image data representing the photographed object;

an image data storage module that stores the image data generated at a predetermined timing by said image data generation module as still image data;

an image output module that outputs the still image data in the form of an image signal to said display unit;

a motion detecting module that detects a motion of the object; and an update control module that updates the storage of said image data storage module, in response to detection of a stop of a motion of the object detected by said motion detecting module.

10. A camera-assisted presentation system in accordance with claim 9, wherein said motion detecting module detects a motion or no motion of the object through comparison of image data generated in time series by said image data generation module.

* * * * *